Jan. 1, 1946.  E. M. COOPER  2,392,231
PLOW FOR ROTARY CHARGER
Filed May 13, 1943
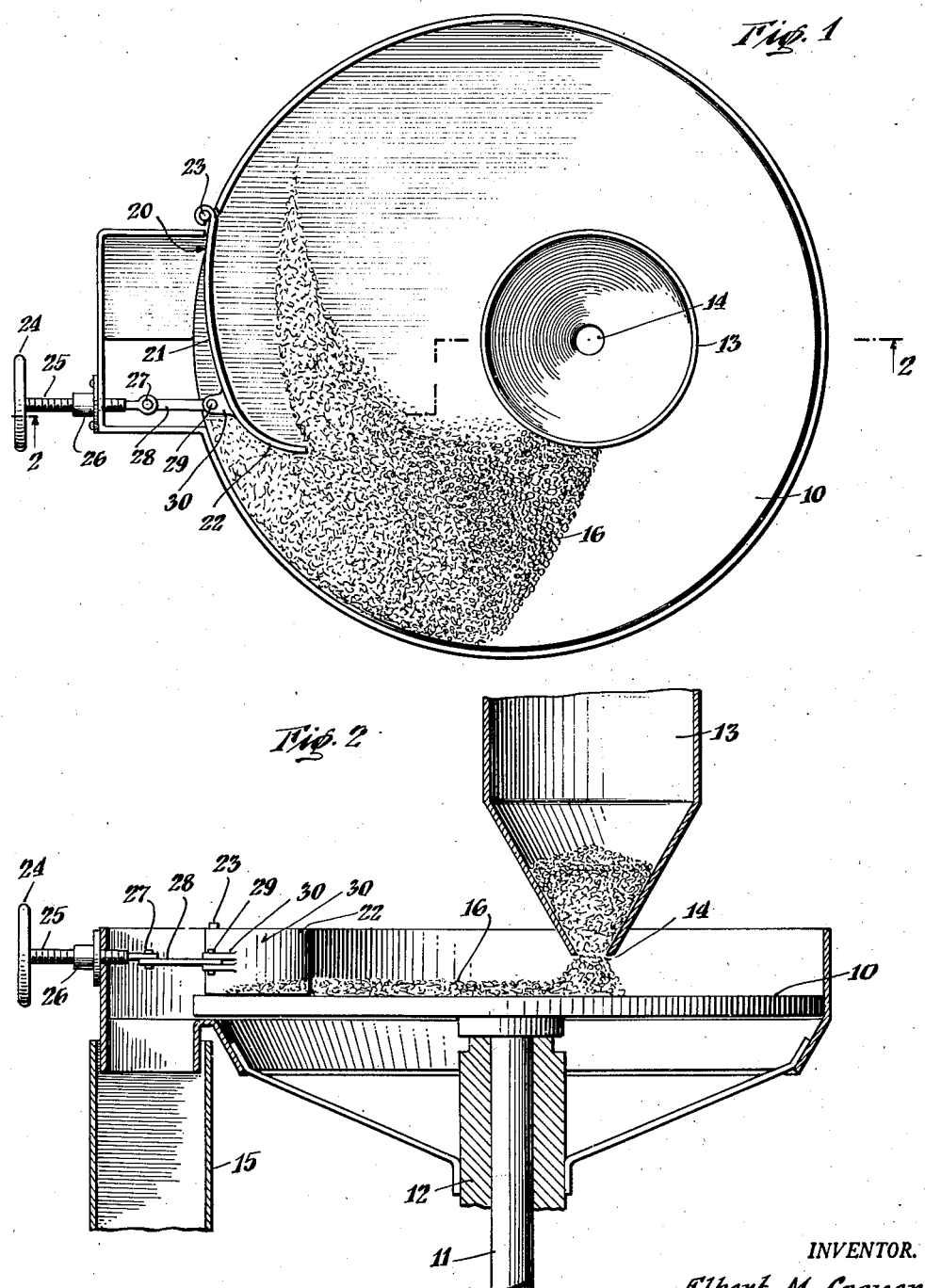
INVENTOR.
Elbert M. Cooper
BY
Furman Rinehart
ATTORNEY Patented Jan. 1, 1946

2,392,231

UNITED STATES PATENT OFFICE 2,392,231

PLOW FOR ROTARY CHARGERS

Elbert M. Cooper, Selby, Calif., assignor to American Smelting and Refining Company, New York, N. Y., a corporation of New Jersey Application May 13, 1943, Serial No. 486,764

2 Claims. (Cl. 222—290)

This invention relates generally to the metallurgical process known as sintering and more particularly to devices for feeding the charge to be sintered to the sintering machine.

Still more particularly, the invention relates to a plow mechanism to remove the charge from the turntable of a rotary charger into the pallet feeding chute.

When a rotary charger is used to mix and feed the charge to the sintering machine pallets, it is conventional practice to discharge the material on to a rotating turntable on which the material is caused to travel toward the periphery. A deflecting plate, and in some instances a plurality of plates, positioned near the mouth of the chute deflects the material off the periphery into the chute from which it is discharged on to the pallets which move under the discharge opening of the chute.

This invention provides a curved plow mechanism of novel construction which is simple to make, low in cost yet effects a uniform distribution of the charge into a chute and is adjustable with ease and facility.

In accordance with a prefered embodiment of the invention, the plow for a conventional rotary charger turntable of approximately six feed diameter is made of one quarter inch steel plate, about seven inches high and five feet long. The first three and one half feet, from the trailing end of the plow, is curved to the radius of the table and acts as a distributor while the last foot and one half breaks away more sharply back toward the table to act as a scraper to deflect the stream of charge into the path of the distributor. The trailing end of the plate is pivoted at the edge of the table, while the distance from the periphery of the table to the leading end of the plow is adjustable by a handwheel to produce an even material overflow along the periphery into the chute to charge pallets of three and one half foot width.

The principle of the design and operation of the plow is that the curved portion of the blade nearest the pivot corresponds to the periphery of the turntable so that the distance between the blade and peripheral edge of the table decreases uniformly in the direction of rotation of the table. This portion is herein referred to as the "distributor" portion. The portion of the blade nearest the leading end (herein referred to as the "scraper portion") is curved more sharply toward the axis of the table to provide a scraper to deflect the material into the path of the distributor portion. By reason of the shape of the distributor portion the material is deflected off the periphery of the edge of the turntable uniformly along the edge adjacent the chute.

Although the novel features which are believed to be characteristic of this invention will be particularly pointed out in the claims appended hereto, the invention itself, as to its objects and advantages, and the manner in which it may be carried out, may be better understood by reference to the following description taken in connection with the accompanying drawing forming a part thereof, in which Fig. 1 is a top plan view of a rotary charger turntable showing an embodiment of the invention; and Fig. 2 is a view in elevation, partly in section, on line 2—2 of Fig. 1.

Referring now to the drawing, the turntable 10 is mounted on a shaft 11 to rotate in a bearing 12. A bin 13 is mounted above the table with its discharge opening 14 off the axis of rotation of the turntable. A discharge chute 15 is mounted adjacent the periphery of the turntable and ordinarily will have a width corresponding to the width of the pallets of the sintering machine to be charged. As will be understood by those skilled in the art, the material 16 is discharged from the bin 13 on to the rotating table 10 and tends to move toward the periphery. As the material reaches the plow it is deflected off the peripheral edge of the table into the chute 15.

The blade of the plow consists of a single plate 20. However, for purposes of description, it may be said to comprise a distributor portion 21 and a scraper portion 22. The trailing end of the plate 20 is mounted on a fixed pivot 23 so that it may be rotated about the pivot to move the leading end toward or away from the chute. That is, the scraper portion may be adjusted to extend into the path of the material moving on the table to any desired distance. It will be apparent that if it is desired to deflect more or less material into the chute, the scraper is adjusted to take a bigger or smaller "bite" into the stream of moving charge. To effect this adjustment there is provided a handwheel 24 mounted on a threaded stem 25 which in turn is movable inwardly and outwardly in an internally threaded boss or nut 26 which may be fixedly mounted, as by rivets, to the chute. Other means of mounting the adjusting mechanism will be suggested by the disclosure. The opposite end of the threaded stem 25 is pivotally attached by a pivot pin 27 to a link 28 which in turn is pivotally attached by a pin 29 to a bracket 30 fixed to the plate 20 at a convenient place on the plate at about the beginning of the sharp bend. To adjust the plate to deflect from the table the desired amount of charge from the moving stream of material, the handwheel 24 may be rotated in the direction necessary to effect the desired result.

It is significant to note that the distributor portion 21 of the plow has a curve, the radius of which is substantially the same as the radius of the turntable, while the portion 22 is curved to give a sharper bend to form a scraper portion to deflect the desired amount of charge into the path of the distributor portion. By reason of the curvature of the distributor portion, the charge is deflected off the peripheral edge of the table uniformly across the mouth of the chute 15. Consequently, the pallets of the sintering machine passing beneath the discharge opening of the chute will be uniformly charged across their width.

What is claimed is:

1. A device for charging material to a sintering machine which comprises: a turntable, a charge bin to feed the charge on to said turntable, said bin being mounted above the turntable with the discharge opening of the former off the axis of rotation of the latter, a charge chute having an opening adjacent the periphery of said turntable, and a plow device, said plow device comprising a one-piece plate having a distributor portion and a scraper portion and extending over the surface of said turntable, said distributor portion being curved to substantially the same radius of curvature as the periphery of said turntable and said scraper portion being curved more sharply than said distributor portion, a pivot adjacent the periphery of said turntable near said chute pivotally mounting the trailing end of said plate, and adjustable means connecting with said plate for rotating said plate on its pivot to adjust said scraper portion in the path of travel of charge fed to said turntable.

2. A plow device for charging material to a sintering machine which comprises: a turntable, a charge bin to feed the charge on to said turntable, said bin being mounted above the turntable with the discharge opening of the former off the axis of rotation of the latter, a charge chute having a material receiving opening adjacent the periphery of said turntable, and a plow device, said plow device comprising a one-piece plate having a distributor portion and a scraper portion and extending over the surface of said turntable, said distributor portion being curved to substantially the same radius of curvature as the periphery of said turntable and said scraper portion being curved more sharply than said distributor portion, a pivot adjacent the periphery of said turntable near said chute pivotally mounting the trailing end of said plate, means mounting an internally threaded member, an externally threaded stem in said member movable toward or away from the periphery of said turntable upon rotation of said stem, and a link connecting said stem and plate, said link acting to move the leading end of said plate toward or away from the periphery of said turntable upon rotation of said stem.

ELBERT M. COOPER.